US011210484B1

(12) United States Patent
Landron et al.

(10) Patent No.: US 11,210,484 B1
(45) Date of Patent: Dec. 28, 2021

(54) SYSTEMS AND METHODS FOR CREATING MACHINE VISION JOBS INCLUDING BARCODE SCANNING

(71) Applicant: ZEBRA TECHNOLOGIES CORPORATION, Lincolnshire, IL (US)

(72) Inventors: David D. Landron, Coram, NY (US); Ankan Basak, Astoria, NY (US); Matthew Lawrence Horner, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/945,452

(22) Filed: Jul. 31, 2020

(51) Int. Cl.
*G06K 7/10* (2006.01)
*G06K 7/14* (2006.01)
*G06F 3/0482* (2013.01)
*G06K 9/62* (2006.01)
*G06F 3/0484* (2013.01)

(52) U.S. Cl.
CPC ....... *G06K 7/10722* (2013.01); *G06F 3/0482* (2013.01); *G06F 3/04847* (2013.01); *G06K 7/1413* (2013.01); *G06K 9/6253* (2013.01)

(58) Field of Classification Search
CPC .. G06K 7/10722; G06K 7/10772; G06K 7/14; G06K 7/1478
USPC ..... 235/462.41, 462.24, 462.11, 375, 462.01
See application file for complete search history.

(56) References Cited

U.S. PATENT DOCUMENTS

| 2003/0136842 | A1* | 7/2003 | Zosel | G06K 7/10881 235/462.22 |
| 2003/0137590 | A1* | 7/2003 | Barnes | H04N 7/181 348/222.1 |
| 2014/0097251 | A1* | 4/2014 | Joussen | G06K 7/1404 235/462.07 |
| 2017/0237844 | A1* | 8/2017 | Gyuris | H04W 48/16 455/41.2 |

* cited by examiner

*Primary Examiner* — Edwyn Labaze
(74) *Attorney, Agent, or Firm* — Yuri Astvatsaturov

(57) ABSTRACT

Methods for creating a machine vision job including barcode scanning are disclosed. An example method may be performed by one or more processors and includes detecting a first configuration of a barcode scanning tool including settings of the barcode scanning tool, wherein the first configuration, when executed by a first imaging device operating in a fixed scanning mode, causes the first imaging device to execute the barcode scanning tool in accordance with the settings. The method also includes upgrading the first configuration to a second configuration of the barcode scanning tool, wherein the second configuration, when executed by a second imaging device operating in a machine vision mode, causes the second imaging device to execute the barcode scanning tool in accordance with the settings. The method further includes displaying a user-selectable option to add the barcode scanning tool configured in accordance with the second configuration to the machine vision job.

20 Claims, 8 Drawing Sheets

FIG. 3

SYSTEMS AND METHODS FOR CREATING MACHINE VISION JOBS INCLUDING BARCODE SCANNING

BACKGROUND

To configure fixed scanning devices that perform barcode scanning, a user typically must interact with a fixed scanning software. The user may utilize the fixed scanning software to set configuration parameters that the fixed scanning device should utilize to perform barcode scanning operations. Determining the configuration parameters most suited for the user's application may require extensive time and trial-and-error. Fixed scanning software applications often only provide the settings and configurability required for barcode scanning.

Scanning devices and related software have been developed that allow users to perform machine vision scanning, which can perform more complex analysis (e.g., scanning for defects in items on an assembly line) than barcode scanning. A desired image analysis job may involve both fixed scanning (i.e., barcode scanning) and machine vision scanning. However, due to segmentation of fixed scanning and machine vision software, a user may not be able to access barcode scanning tools and configurations within a machine vision job setup.

For example, a user may have a barcode scanning configuration that the user has previously developed using a fixed scanning software or a fixed scanning portion of an application. If the user wishes to configure a machine vision job including a barcode scanning tool or augment their configured barcode scanning tool with machine vision capabilities, the user must create a new machine vision job and re-create the previous barcode scanning configuration. This required re-creation results in inefficiencies such as increased time and increased expense. Further, recreating the barcode scanning configuration is prone to errors.

Accordingly, there is a need for improved methods of creating machine vision jobs that include barcode scanning.

SUMMARY

In an embodiment, the present invention is a method for creating one or more machine vision jobs including barcode scanning. The method includes detecting, by one or more processors, a first configuration of a barcode scanning tool including settings of the barcode scanning tool, wherein the first configuration, when executed by a first imaging device operating in a fixed scanning mode, causes the first imaging device to execute the barcode scanning tool in accordance with the settings. The method also includes upgrading, by the one or more processors, the first configuration to a second configuration of the barcode scanning tool, wherein the second configuration, when executed by a second imaging device operating in a machine vision mode, causes the second imaging device to execute the barcode scanning tool in accordance with the settings. The method further includes displaying, by the one or more processors via a graphical user interface (GUI), a user-selectable option to add the barcode scanning tool configured in accordance with the second configuration to a machine vision job.

In a variation of this embodiment, the first imaging device and the second imaging device may be a same imaging device.

In a variation of this embodiment, the method includes detecting, by the one or more processors, a selection of the user-selectable option to add the barcode scanning tool to the machine vision job and displaying, by the one or more processors within the GUI, the barcode scanning tool in a job flow of the machine vision job. The method may further include displaying, by the one or more processors within the GUI, the settings of the barcode scanning tool in response to detecting the selection of the user-selectable option to add the barcode scanning tool to the machine vision job.

Moreover, in variations of this embodiment, the method includes displaying, by the one or more processors via the GUI, at least one additional user-selectable option to add a machine vision tool to the machine vision job. The machine vision tool may be, for example, selected from one or more of a binarization tool, a pattern match tool, or an edge detection tool. The method may further include detecting, by the one or more processors, a selection of the user-selectable option to add the barcode scanning tool to the machine vision job; detecting, by the one or more processors, a selection of the at least one additional user-selectable option to add the machine vision tool to the machine vision job; and displaying, by the one or more processors within the GUI, the machine vision tool and the barcode scanning tool in a job flow of the machine vision job. In addition, the method may include displaying, by the one or more processors via the GUI, a user-selectable option to deploy the machine vision job to the second imaging device; detecting, by the one or more processors, a selection of the user-selectable option to deploy the machine vision job to the second imaging device; and deploying, by the one or more processors, the machine vision job to the second imaging device. Deploying the machine vision job to the second imaging device may include generating, by the one or more processors, a job script including the second configuration of the barcode scanning tool and a configuration of the machine vision tool; and transmitting, by the one or more processors via a network connection, the job script to the second imaging device for execution by the second imaging device operating in the machine vision mode.

Furthermore, in variations of this embodiment, upgrading the first configuration to the second configuration may include generating the second configuration, the second configuration including (i) an indication that the second configuration is for machine vision jobs and (ii) the settings of the first configuration. The method may also include displaying the user-selectable option to add the barcode scanning tool to the machine vision job in response to detecting the indication that the second configuration is for machine vision jobs.

In another embodiment, the present invention is a computer system for creating one or more machine vision jobs including barcode scanning. The computer system includes a first imaging device, a second imaging device, one or more processors, and a non-transitory program memory communicatively coupled to the one or more processors and storing executable instructions that, when executed by the one or more processors, cause the computer system to detect a first configuration of a barcode scanning tool including settings of the barcode scanning tool, wherein the first configuration, when executed by the first imaging device operating in a fixed scanning mode, causes the first imaging device to execute the barcode scanning tool in accordance with the settings. The instructions also cause the computer system to upgrade the first configuration to a second configuration of the barcode scanning tool, wherein the second configuration, when executed by the second imaging device operating in a machine vision mode, causes the second imaging device to execute the barcode scanning tool in accordance with the settings. The instructions further cause the computer system to display, via a graphical user interface (GUI), a user-selectable option to add the barcode scanning tool configured in accordance with the second configuration to a machine vision job.

In a further embodiment, the present invention is a tangible, non-transitory computer-readable medium storing executable instructions for creating one or more machine vision jobs including barcode scanning that, when executed by at least one processor of a computer system, cause the computer system to detect a first configuration of a barcode scanning tool including settings of the barcode scanning tool, wherein the first configuration, when executed by a first imaging device operating in a fixed scanning mode, causes the first imaging device to execute the barcode scanning tool in accordance with the settings. The instructions also cause the computer system to upgrade the first configuration to a second configuration of the barcode scanning tool, wherein the second configuration, when executed by a second imaging device operating in a machine vision mode, causes the second imaging device to execute the barcode scanning tool in accordance with the settings. The instructions further cause the computer system to display, via a graphical user interface, a user-selectable option to add the barcode scanning tool configured in accordance with the second configuration to a machine vision job.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 depicts an example application interface utilized to manage imaging devices and construct machine vision jobs for execution by the imaging devices, in accordance with embodiments described herein.

Figure 1:
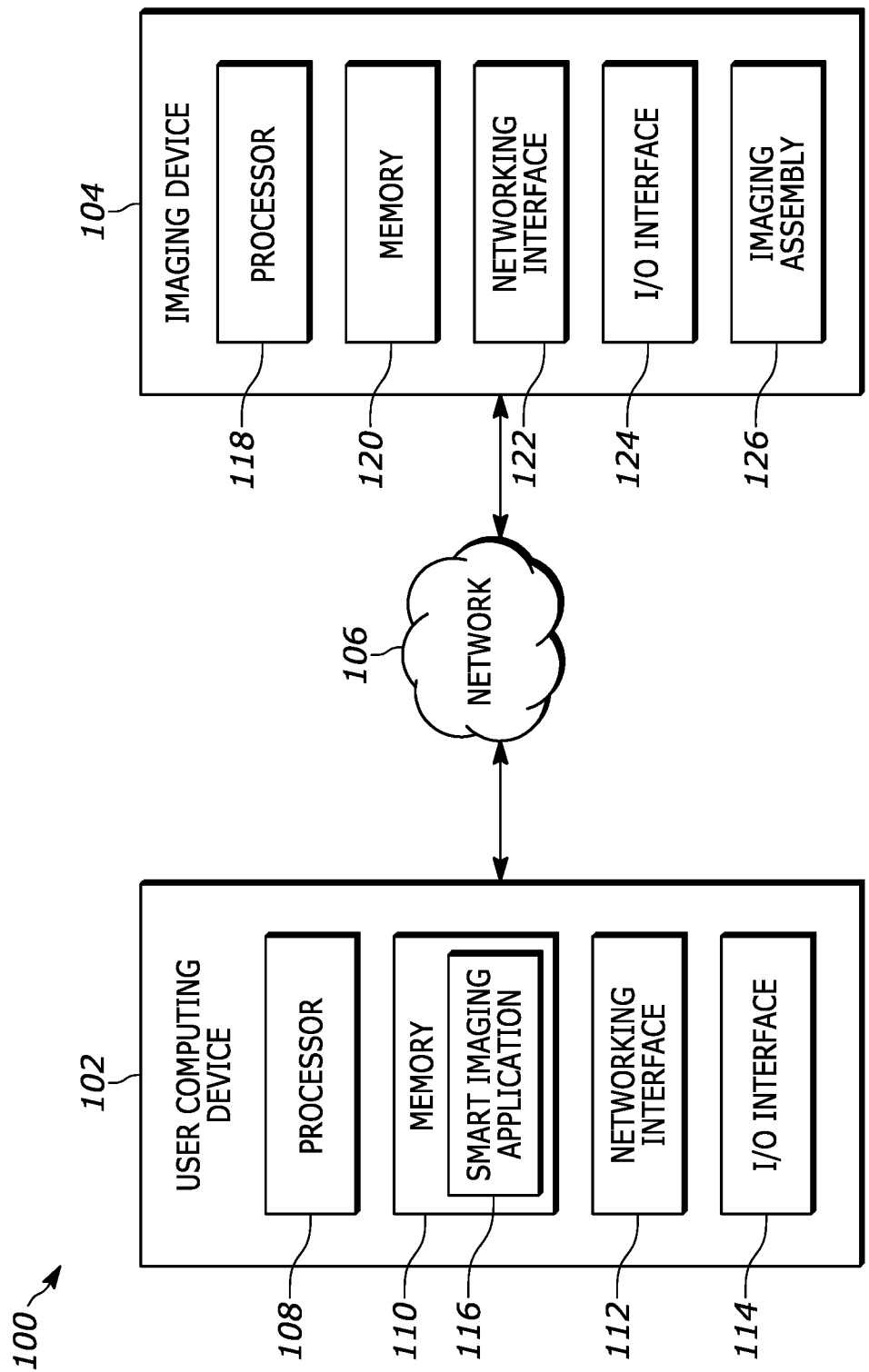
FIG. 1 is an example system for creating a machine vision job including barcode scanning, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present disclosure provides techniques to facilitate creation of machine vision jobs that include barcode scanning. More specifically, the techniques of the present disclosure include automatically detecting a previous configuration of a barcode scanning tool executable by an imaging device operating in a fixed scanning mode, and upgrading such a configuration to a new configuration executable by an imaging device operating in a machine vision mode. The techniques further include displaying a user-selectable option to select the new configuration and add the new configuration to a machine vision job. Advantageously, the new configuration may include the same settings as the previous configuration. Thus, a user may easily add to a machine vision job a barcode scanning tool configured with the same settings as were previously configured for a fixed scanning job. Said another way, the techniques of this disclosure enable a computer system to automatically migrate a barcode scanning tool to a machine vision job including any previously-configured settings of the barcode scanning tool. Applying the techniques of the present disclosure results in reduced required interactions between the user and computing system, as the user does not need to manually re-create the settings of the previous configuration in order to add the barcode scanning tool to a machine vision job. Further, using the techniques of the present disclosure reduces the probability that the new configuration includes any errors or deviations from the previous configuration, reducing costs and inefficiencies for implementing machine vision.

FIG. 1 illustrates an example smart imaging system 100 configured to analyze pixel data of an image of a target object to optimize one or more imaging settings for a machine vision job, in accordance with various embodiments disclosed herein. In the example embodiment of FIG. 1, the smart imaging system 100 includes a user computing device 102 and an imaging device 104 communicatively coupled to the user computing device 102 via a network 106. Generally speaking, the user computing device 102 is configured to enable a user/operator to create a machine vision job for execution on the imaging device 104. Once created, the user/operator may then transmit/upload the machine vision job to the imaging device 104 via the network 106, where the machine vision job is then interpreted and executed. The user computing device 102 may comprise one or more operator workstations, and may include one or more processors 108, one or more memories 110, a networking interface 112, an input/output interface 114, and a smart imaging application 116.

The imaging device 104 is connected to the user computing device 102 via a network 106, and is configured to interpret and execute machine vision jobs received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the user computing device 102. Additionally or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120, a networking interface 122, an input/output interface 124, and an imaging assembly 126. The imaging assembly 126 may include a digital camera and/or digital video camera for capturing or taking digital images and/or frames. Each digital image may comprise pixel data that may be analyzed by one or more tools each configured to perform a machine vision task, as described herein. The digital camera and/or digital video camera of, e.g., the imaging assembly 126 may be configured to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In embodiments, imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The composite area defined by the ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the smart imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the smart imaging application 116, which may be configured to enable machine vision job construction, as described further herein. Additionally, or alternatively, the smart imaging application 116 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the user computing device 102 and the imaging device 104 via wireless communications based on any one or more of various wireless standards, including by non-limiting example, IEEE 802.11a/b/c/g (WIFI), the BLUETOOTH standard, or the like.

The input/output interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The input/output interfaces 114, 124 may also include input/output components (e.g., ports, capacitive or resistive touch sensitive input panels, keys, buttons, lights, LEDs), which may be directly/indirectly accessible via or attached to the user computing device 102 and/or the imaging device 104. According to some embodiments, an administrator or user/operator may access the user computing device 102 and/or imaging device 104 to construct jobs, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
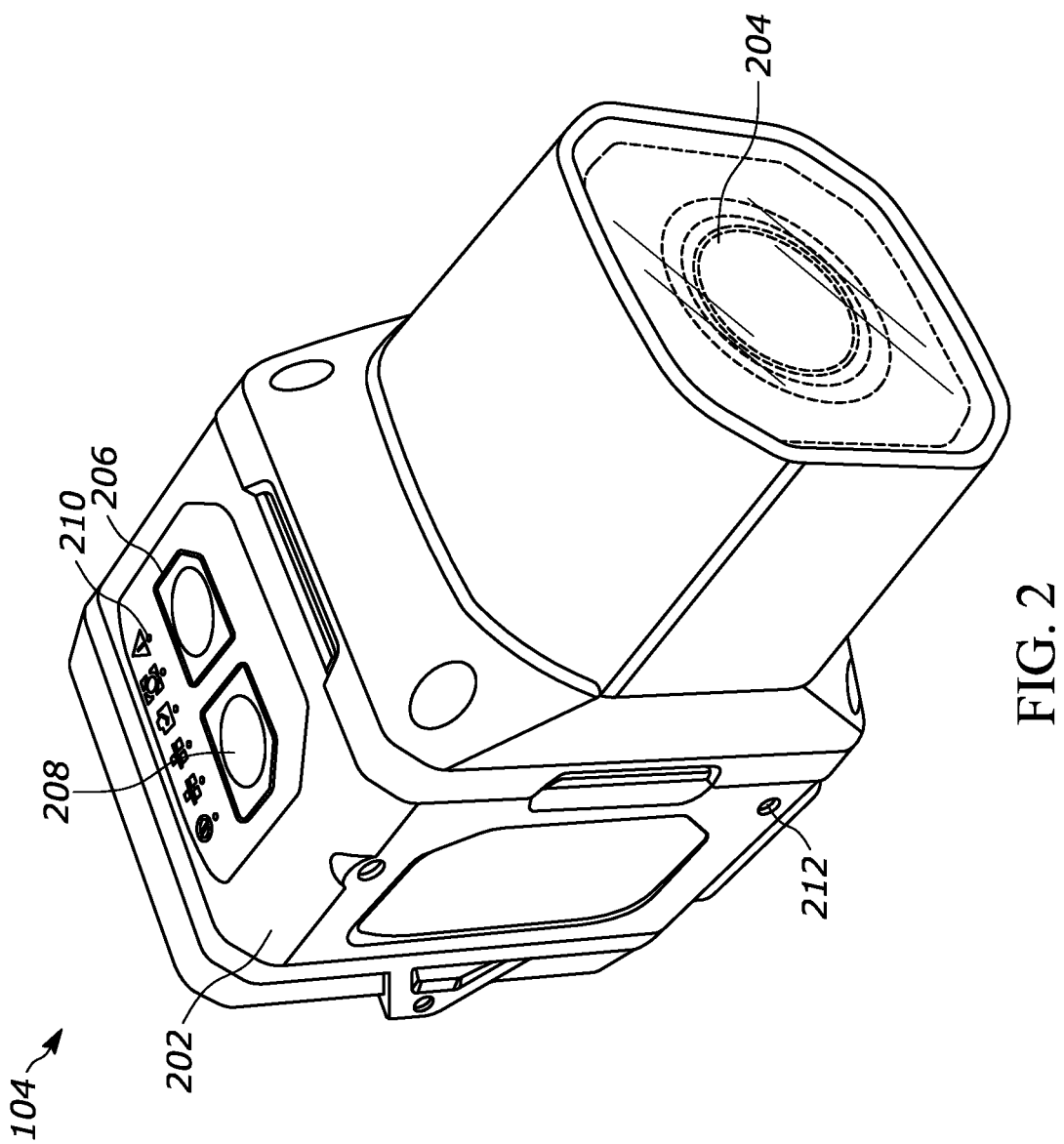
FIG. 2 is a perspective view of the imaging device of FIG. 1, in accordance with embodiments described herein.

FIG. 2 is a perspective view of the imaging device 104 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120) for use in later developed machine vision jobs, as discussed herein.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., smart imaging application 116). The imaging configuration screen may allow the user to configure one or more configurations of the imaging device 104 (e.g., aperture size, exposure length, etc.) that may be stored in memory (e.g., one or more memories 110, 120) for use in later developed machine vision jobs, as discussed herein.

To further this example, and as discussed further herein, a user may utilize the imaging configuration screen (or more generally, the smart imaging application 116) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 3:
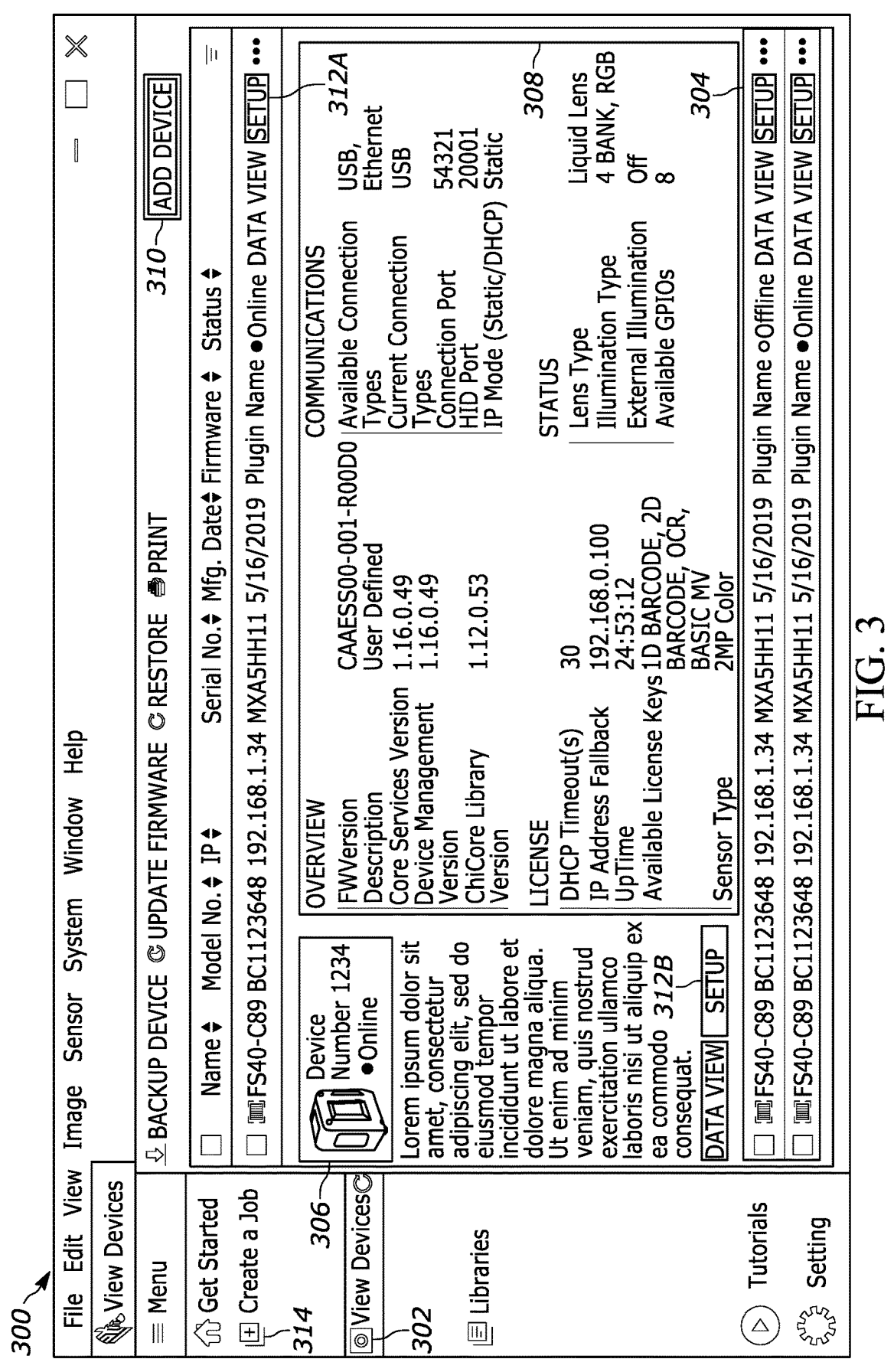

FIG. 3 depicts an example application interface 300 utilized to manage imaging devices and construct machine vision jobs, in accordance with embodiments described herein. Generally, the example application interface 300 may represent an interface of a smart imaging application (e.g., smart imaging application 116) a user may access via a user computing device (e.g., user computing device 102). The example application interface 300 (as well as application interfaces 400, 420, 500, 520, or any other application interface of the smart imaging application 116) may be an interactive GUI displayed on a display screen (e.g., included in the I/O interfaces 114, 124) that the user may interact with to make selections relating to managing imaging devices and constructing machine vision jobs (e.g., by interacting with I/O interfaces 114, 124). Specifically, the example application interface 300 may present a user with a list of all available devices (e.g., imaging device 104) to which a user may connect and/or construct machine vision jobs when the user selects the view devices tab 302. From here, the user may view the device selection list 304, which may display each connected device a user may access, and may further include information such as, but without limitation, a device name, a device model number, an IP address corresponding to the device, a device serial number, a device manufacture date, a device firmware status, a device online status, and/or any other suitable indication. The example application interface 300, for example, may be displayed by the smart imaging application 116 when the smart imaging application 116 is operating in a device management mode.

The user may then select a device, indicated by the selected device indicator 306, from the device selection list 304, intending to configure and/or otherwise view some setting of the device. The selected device indicator 306 may display the device name and the device online status, and may additionally or alternatively include any other information related to the device. Upon selection of the device indicated in the selected device indicator 306, the smart imaging application 116 may additionally display a selected device configuration listing 308 within the example application interface 300. The selected device configuration listing 308 may include a variety of information concerning the selected device such as, but without limitation, a selected device general overview (e.g., firmware updates, library updates, etc.), a selected device licenses overview (e.g., DHCP timeout(s), IP address fallback, etc.), a selected device communications overview (e.g., available connection types, current connection type, etc.), a selected device status overview (e.g., lens type, illumination type, etc.), and/or any other suitable information or combinations thereof.

In addition, the selected device configuration listing 308 may include an indication of the machine vision jobs executed, stored, and/or otherwise associated with the selected device. For example, the selected device configuration listing 308 may indicate that the selected device is configured to operate in accordance with a first machine vision job that was uploaded to the selected device at a first time (e.g., "Uploaded at 10:00 AM on 10/10/18"). The selected device configuration listing 308 may additionally indicate that the first machine vision job includes a first configuration of one or more image settings corresponding to the selected device and a second configuration of the one or more image settings corresponding to the selected device. Each of the one or more image settings included in the first and second configuration may additionally be displayed in the selected device configuration listing 308.

The example application interface 300 may additionally include an add device function 310 to allow a user to add additional devices, for example, not found in the device selection list 304. If a user acquires a new device, such as an imaging device (e.g., imaging device 104) the user may click, swipe, and/or otherwise interact with the add device function 310 to add the new device to the device selection list 304. Moreover, once the new device has been added, the user may interact with the setup device functions 312A/B to configure and/or otherwise view the settings corresponding to the new device. Accordingly, the user may interact with the setup device functions 312A/B at any time after a device is added to the device selection list 304 to adjust, view, or otherwise manage the device settings.

Additionally or alternatively, when the user interacts with the setup device functions 312A/B the smart imaging application 116 may generate/render a new interface allowing the user to configure a machine vision job for the selected device (e.g., as indicated by the selected device indicator 306). The user may additionally cause the smart imaging application 116 to generate/render the new interface by interacting with the job creation tab 314. In this manner, the user may transition away from the example application interface 300 to configure a machine vision job corresponding to the selected device through an interaction with either the setup device function 312A/B or the job creation tab 314.

Figure 4A:
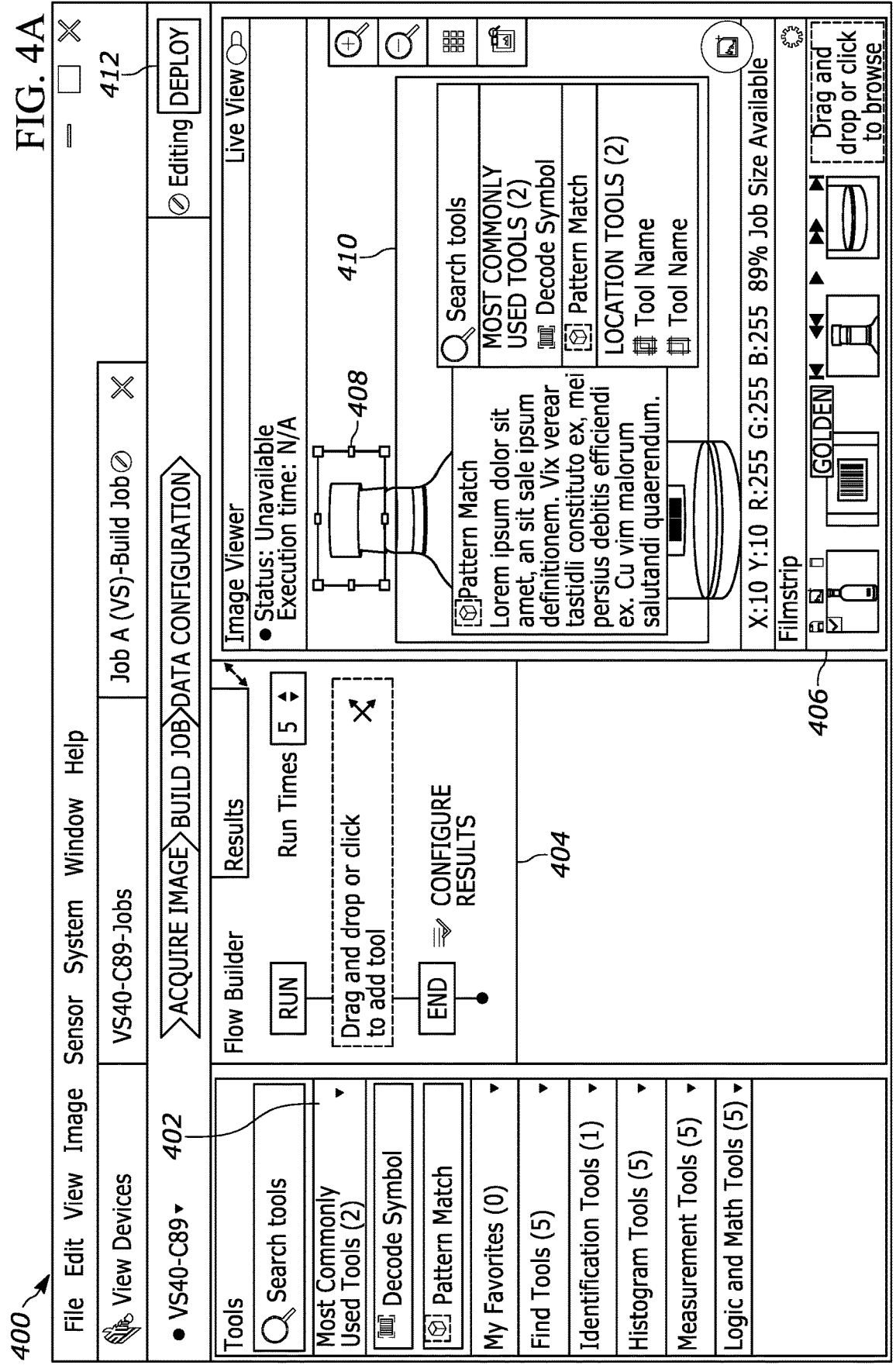
FIGS. 4A-4B depict additional application interfaces utilized to construct machine vision jobs, in accordance with embodiments described herein.
Figure 4B:
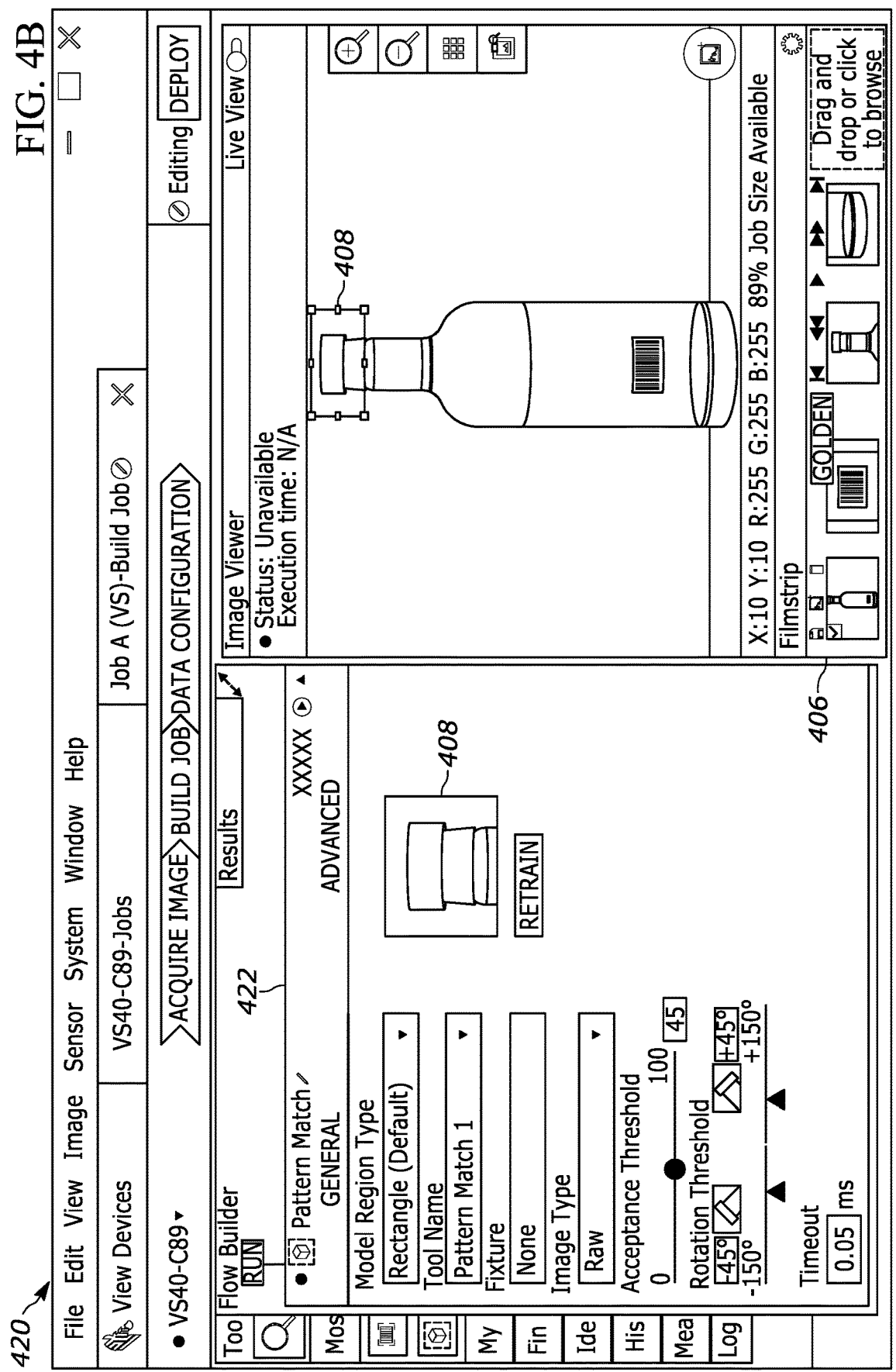

FIGS. 4A-4B depict additional application interfaces utilized to construct machine vision jobs, in accordance with embodiments described herein. For example, after interacting with the job creation tab (e.g., job creation tab 314) and/or the setup device function (e.g., setup device function 312A/B), the smart imaging application (e.g., smart imaging application 116) may transition the user to a job construction application interface 400, depicted in FIG. 4A. The job construction application interface 400, for example, may be displayed by the smart imaging application 116 when the smart imaging application 116 is operating in a job construction mode. Generally, the user may utilize the job construction application interface 400 to organize and configure machine vision tools into a particular sequence that defines a respective machine vision job. The user may additionally utilize the job construction application interface 400 to upload the respective machine vision job to an imaging device (e.g., imaging device 104) for interpretation and execution.

To build a machine vision job, the user may select tools configured to perform machine vision functions. The user may select a tool by clicking, swiping, dragging, and/or otherwise interacting with the available tool(s) list 402. Each tool may be included in drop-down list (as illustrated) of the available tool(s) list 402, or may be plainly visible to the user on the available tool(s) list 402. In any event, the user may select and move a desired tool over to the job flow builder section 404 to begin constructing a machine vision job. In the job flow builder section 404, the user may organize each selected tool into an optimal/preferential order, i.e., a job flow, based upon the requirements of the machine vision job. Further, the user may configure each tool to more accurately satisfy the requirements of the machine vision job. For example, the user may configure a barcode scanning tool selected from the available tool(s) list 402 to scan over a larger/smaller area of image(s) captured by the selected device (e.g., imaging device 104).

The user may also select a representative image from the job filmstrip 406 in order to complete configuration of the selected tools. The job filmstrip 406 may include real-time images from the selected device, or they may be stored images (e.g., in the one or more memories 110, 120) that are representative of an ideal image capture for the machine vision job. Additionally or alternatively, the smart imaging application 116 may automatically populate the job filmstrip 406 based on the selected tools in the job flow builder section 404. Once selected, the representative image may appear in a larger section above the job filmstrip 406 that enables the user to place tool ROIs 408 over the representative image. A tool ROI 408 indicates a region of the representative image that the tool represented by the tool ROI 408 may analyze using a machine vision technique. For example, if the tool ROI 408 represents the ROI of a barcode scanning tool, then the barcode scanning tool will scan for a barcode within the region of the representative image indicated by the tool ROI 408.

If the user cannot decide on an appropriate tool for a machine vision job, the user may click, swipe, and/or otherwise interact with the job construction application interface 400 and the smart imaging application 116 may generate/render the tool information region 410. Generally speaking, the smart imaging application 116 may provide a user with commonly used tool suggestions, tool type suggestions, descriptions of each tool included in the tool information region 410, and/or any other suitable information of combinations thereof. For example, the smart imaging application 116 may provide a user with an option in the tool information region 410 to search for a particular tool by typing, speaking, and/or otherwise indicating a name, function, or other representative quality of the tool.

Once the user has selected and/or ordered one or more tools, and thus created a machine vision job, the job deployment toggle 412 allows a user to upload the machine vision job to the selected device (e.g., imaging device 104). The smart imaging application 116 may register the user interaction with the job deployment toggle 412 and convert the machine vision job to a job file that is then transmitted (e.g., via network 106) to the selected device. The machine vision job may also be stored in memory (e.g., one or more memories 110, 120). The user may additionally toggle the uploaded machine vision job into active/inactive use by interacting with the job deployment toggle 412. Thereafter, the user may adjust configurations/settings associated with the machine vision job by accessing the machine vision job and interacting with the one or more tools in the available tool(s) list 402 and/or the job builder flow section 404, the images in the job filmstrip 406, the tool ROIs 408, and/or by the options within the tool information region 410.

In various embodiments, the job construction application interface 400 allows a user to construct multiple machine vision jobs to be executed in sequence for a selected device (e.g., imaging device 104). For example, the job construction application interface 400 may allow a user to construct a first machine vision job comprising a first set of tools that adjust the configuration of the selected device to a first configuration. The first configuration may include one or more imaging settings of the selected device such as, without limitation, an aperture size, an exposure length, an ISO value, and/or any other suitable value or combinations thereof. The job construction application interface 400 may also allow the user to construct a second machine vision job comprising a second set of tools that adjust the configuration of the selected device to a second configuration. The second set of tools may be the same or different from the first set of tools, and the second configuration may be the same or different from the first configuration. In any event, the smart imaging application 116 may transmit both machine vision jobs to the selected device, and may store both machine vision jobs in memory (e.g., one or more memories 110, 120). Thereafter, the selected device may sequentially perform the first machine vision job and the second machine vision job automatically, e.g., may capture at least one image in accordance with the first configuration, automatically adjust to the second configuration, and capture at least one image in accordance with the second configuration.

However, the user may desire to configure the specific functionality of each tool included in the job builder flow section 404. Thus, the user may interact with a tool in the job builder flow section 404 or other area of the job construction application interface 400, and the smart imaging application 116 may generate/render the tool configuration application interface 420. Turning to FIG. 4B, the tool configuration application interface 420, for example, may be displayed by the smart imaging application 116 when the smart imaging application 116 is operating in a job construction mode. The tool configuration application interface 420 may enable a user to customize the specific functionality of each tool included in a machine vision job via the user-selectable options present in the tool configuration region 422. For example, the tool configuration region 422 may include tool configuration options such as, without limitation, a tool model region type, a tool name, a tool fixture, a tool image type, a tool acceptance threshold, a tool rotation threshold, a tool timeout, and/or any other suitable tool configuration option. In this manner, the smart imaging application 116 allows a user to fully customize the selection, order, and individual configuration of each tool included in a machine vision job. After an individual tool is configured and added to the job flow of a machine vision job, the settings for the tool may be stored on the user computing device 102 as a tool configuration file (e.g., a JSON representation/data format of the tool), or other appropriate form, that can be converted into a job script corresponding to the tool, or added to a job script corresponding to multiple tools. The tool configuration file including the settings corresponding to the tool configuration may be executed by the imaging device 104. For example, if the job deployment toggle 412 is selected, the smart imaging application 116 may generate a job script including tools within the job flow of the machine vision job, where tools are represented in the job script in accordance with the settings from the corresponding tool configuration file.

Figure 5A:
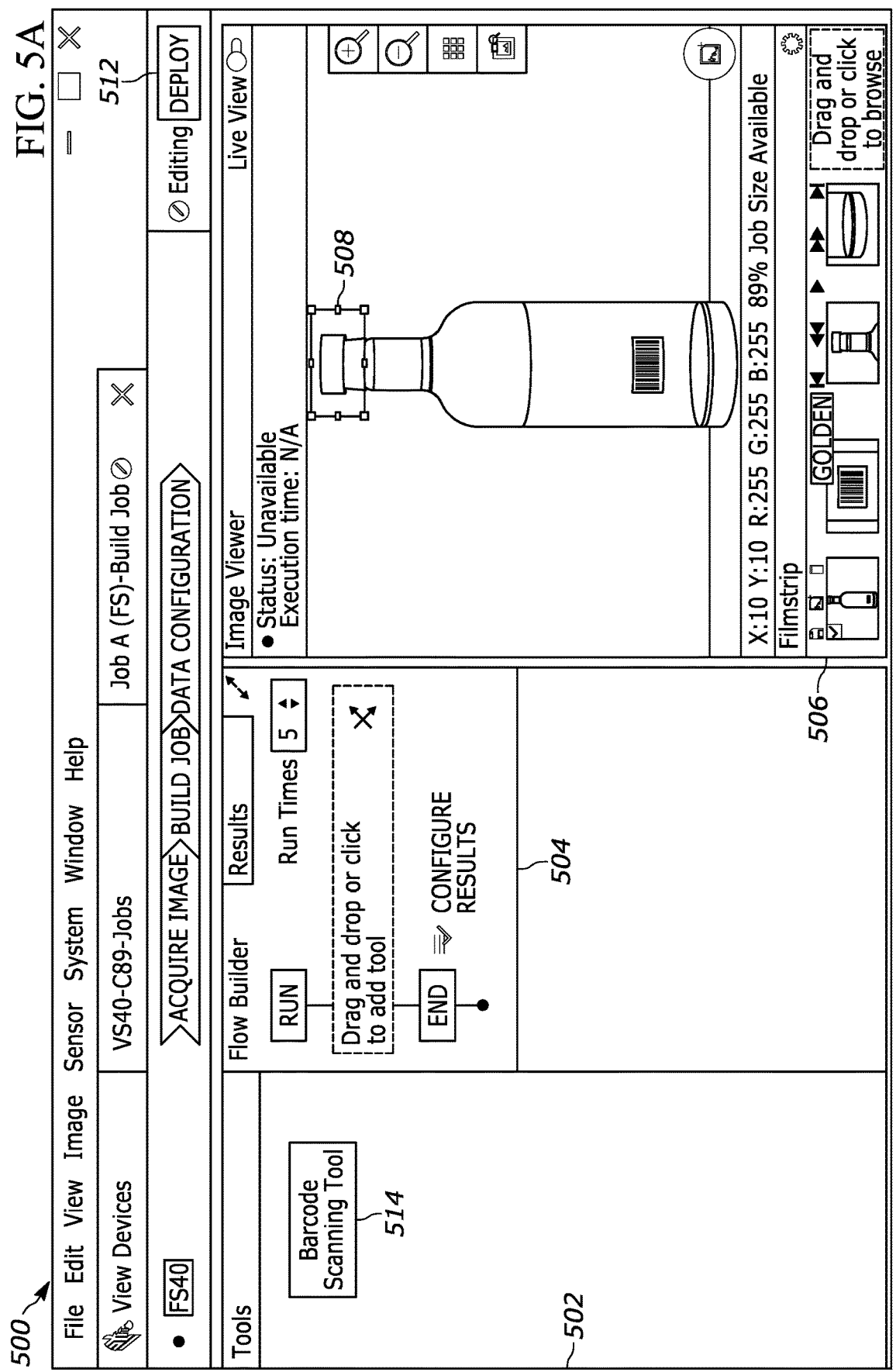
FIGS. 5A-5B depict additional application interfaces utilized to construct fixed scanning and machine vision jobs, in accordance with embodiments described herein.
Figure 5B:
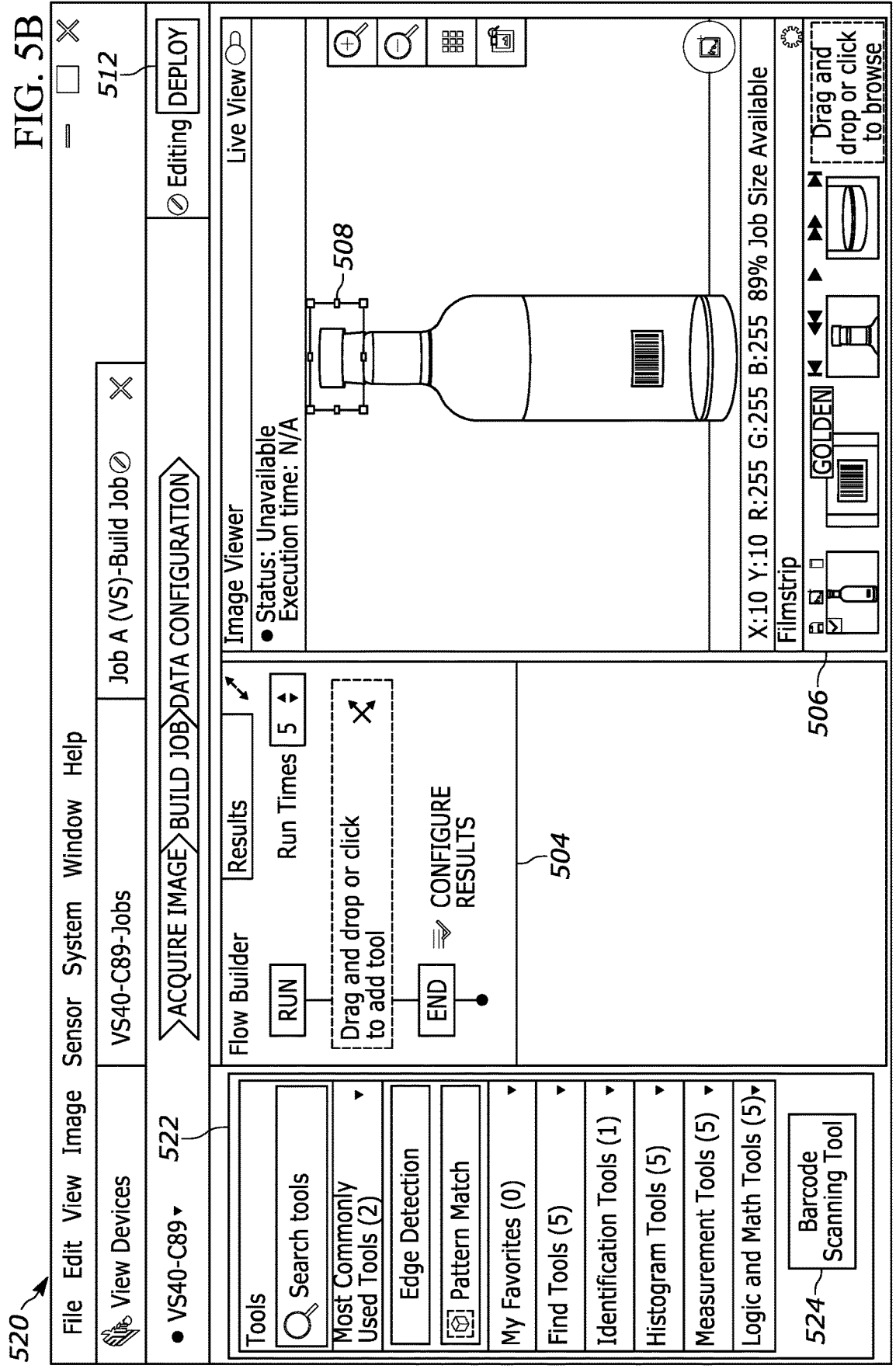

FIGS. 5A-5B depict additional application interfaces utilized to create fixed scanning and machine vision jobs. In some embodiments, the smart imaging application 116 may have different modes directed to fixed scanning and machine vision, respectively. When operating in the fixed scanning mode, the tool options may include only a barcode scanning tool. When operating in the machine vision mode, the tool options may include multiple machine vision tools (e.g., edge detection, pattern matching, object detection, etc) and, in the present disclosure, a barcode scanning tool. Correspondingly, imaging devices (e.g., the imaging device 104) may operate in a fixed scanning mode or a machine vision mode. When operating in the fixed scanning mode, the imaging device 104 may only execute job scripts including barcode scanning tools. When operating in the machine vision mode, the imaging device 104 may execute job scripts including any tools, including machine vision tools or barcode scanning tools. Some imaging devices, due to hardware constraints, may only be capable of fixed scanning. Other imaging devices may be capable of either fixed scanning or machine vision. The techniques of this disclosure enable the smart imaging application 116 to display a barcode scanning tool within application interfaces of the smart imaging application 116 while the smart imaging application 116 is operating in a machine vision mode, as discussed in detail below.

As depicted in FIG. 5A, a fixed scanning job construction application interface 500 may be generally similar to the job construction application interface 400, with the exception that the fixed scanning job construction application interface 500 may be displayed by the smart imaging application 116 when the smart imaging application 116 is operating in a fixed scanning job construction mode. In contrast, the job construction application interface 400 may be displayed by the smart imaging application 116 when the smart imaging application is operating in a machine vision job construction mode. The job construction mode may be indicated on the application interfaces. For example, while the fixed scanning job construction application interface 500 includes a heading—"Job A (FS)—Build Job," indicating that the interface is for building a fixed scanning (FS) job entitled Job A, the job construction application interface 400 includes a heading—"Job A (VS)—Build Job," indicating that the interface is for building a machine vision (or vision scanning (VS)) job entitled Job A.

A job flow builder section 504, job filmstrip 506, tool ROI 508, and job employment toggle 512 may be generally similar to the job flow builder section 404, job filmstrip 406, tool ROI 408, and job deployment toggle 412, respectively. An available tool list 502 is similar to the available tool list 402, except that the available tool list 502 includes one tool related to fixed scanning rather than multiple tools related to machine vision. The available tool list 502 includes a user-selectable option for a barcode scanning tool 514. The user may select the barcode scanning tool 514 in order to add the barcode scanning tool 514 to a job flow of a fixed scanning job. For example, after the user selects the barcode scanning tool 514, the barcode scanning tool may appear in the job flow builder section 504. After the smart imaging application detects selection of the barcode scanning tool 514, the job construction application interface 500 may display options to customize the settings of the barcode scanning tool 514 for the user's particular fixed scanning job.

A user may specify a first configuration of the barcode scanning tool 514 while the smart imaging application 116 is operating in a fixed scanning job construction mode. To create the first configuration, the user may interact with the fixed scanning job construction application interface 500 to adjust settings of the barcode scanning tool 514, which may include device configuration settings that an imaging device (e.g., the imaging device 104) can utilize to execute the barcode scanning tool 514 while operating in a fixed scanning mode. The first configuration may be represented on the user computing device 102 as a tool configuration file (or other appropriate form that includes the configuration settings). When the smart imaging application 116 detects selection of the job deployment toggle 512, the tool configuration file may be converted into a job script which the user computing device 102 can transmit to the imaging device for execution.

The first configuration may be saved, for example, in the form of a tool configuration file on the user computing device 102 and/or within a job script such that when the user selects the barcode scanning tool 514 when editing a fixed scanning job, the settings corresponding to the first configuration may automatically populate as the default settings for the barcode scanning tool 514. The first configuration may be associated with a specific imaging device (e.g., the first configuration may be configured for the specific imaging device in accordance with the capabilities of the specific imaging device and may be transmitted to the specific imaging device for execution as part of a fixed scanning job).

Turning to FIG. 5B, a machine vision job construction application interface 520 may be generally similar to the job construction application interface 400. The machine vision job construction application interface 520 may also be generally similar to the fixed scanning job construction application interface 500, with the exception that that the machine vision job construction application interface 520 may be displayed by the smart imaging application 116 while the smart imaging application 116 is operating in a machine vision job construction mode. For example, the machine vision job construction application interface 520 includes a heading—"Job A (VS)—Build Job," indicating that the interface is for building a machine vision (or VS) job entitled job A.

A user may toggle between different modes of the smart imaging application 116 by interacting with a menu, toolbar, or options included in the application interfaces of the smart imaging application 116. For example, at a first time, the smart imaging application 116 may display the fixed scanning job construction application interface 500. At a later time, due to a selection by the user or due to the user upgrading the smart imaging application 116, the smart imaging application 116 may display the machine vision job construction application 520. In some embodiments, the smart imaging application 116 may automatically display the fixed scanning job construction application interface 500 if the smart imaging application 116 detects that the user is editing a fixed scanning job for an imaging device that is only capable of fixed scanning, and may automatically display the machine vision job construction application interface 520 if the smart imaging application 116 detects that the user is editing a machine vision job for an imaging device that is capable of machine vision scanning.

The machine vision job construction application interface 520 includes the job flow builder section 504, the job filmstrip 506, tool ROI 508, and job deployment toggle 512. In contrast to the available tool list 502, an available tool list 522 includes multiple tools related to machine vision, such as pattern matching, edge detection, binarization, or the like.

The available tool list 522 also includes a user-selectable option to select a barcode scanning tool 524. The barcode scanning tool 524 may be the same as the barcode scanning tool 514. More particularly, the barcode scanning tool 524 may have the same settings and options to customize the settings as the barcode scanning tool 514. Thus, a user may configure the barcode scanning tool 524 and add the barcode scanning tool 524 to a machine vision job including machine vision tools.

If the user computing device 102 and/or an imaging device communicatively connected to the user computing device 102 has a previously configured first configuration (e.g., saved or stored as a first tool configuration file or as a tool configuration included in a first job script) for the barcode scanning tool 514, the smart imaging application 116 may detect the first configuration of the barcode scanning tool 514. In response to detecting the first configuration, the smart imaging application 116 may convert or upgrade the first configuration of the barcode scanning tool 514, which is executable by an imaging device operating in a fixed scanning mode, to a second configuration of the barcode scanning tool 524, which is executable by an imaging device operating in a machine vision mode. A trigger for the upgrade may be that the smart imaging application 116 detects the first configuration on the user computing device 102, or on the imaging device communicatively connected to the user computing device, when transitioning to a machine vision mode (e.g., a transition due to a user selection or due to detecting that the user is configuring a job for an imaging device capable of machine vision).

Upgrading the first configuration to the second configuration may include generating a second configuration that (i) includes an indication that the second configuration is for a machine vision job, and (ii) includes the same settings as the first configuration. More particularly, the smart imaging application 116 may upgrade the first configuration to the second configuration by updating the first tool configuration file to a second tool configuration file. The second tool configuration file includes an indication that the second tool configuration file corresponds to a tool for a machine vision job, whereas the first tool configuration file includes an indication that the first tool configuration file corresponds to a tool for a fixed scanning job. For instance, the indication may be a flag, variable, or parameter within the tool configuration files. The second configuration may have the same settings that were previously configured for the barcode scanning tool 524. Thus, the second configuration may cause an imaging device to execute the barcode scanning tool 524 in accordance with the same settings as the first configuration.

As another example, a first configuration of a barcode scanning tool may be included within a first tool configuration file. The first tool configuration file may include an indication within the file (e.g., a flag, parameter, or variable) that indicates that the first configuration is for a fixed scanning job. If the smart imaging application 116 detects the first tool configuration file, the smart imaging application 116 displays the barcode scanning tool 514 in the available tool list 502 and, if the barcode scanning tool 514 is selected, may display the settings of the first configuration. If the first tool configuration file is upgraded to a second configuration, then the indication within the file may change to an indication that indicates that the second tool configuration is for a machine vision job. If the smart imaging application detects the indication within the second tool configuration file, the smart imaging application displays the barcode scanning tool 524 in the available tool list 522. If the barcode scanning tool 524 is selected, then the smart imaging application 116 may display the settings of the second configuration, which are the same settings as the first configuration. Thus, if the smart imaging application 116 detects the first configuration of the barcode scanning tool 514 and upgrades the first configuration to the second configuration of the barcode scanning tool 524, then if the user selects the barcode scanning tool 524, the settings corresponding to the second configuration (and, correspondingly, the first configuration) may automatically populate as the default settings for the barcode scanning tool 524. As a result, if the user has previously configured settings for the barcode scanning tool 514, the user does not need to re-configure or re-create these settings for the barcode scanning tool 524.

In some embodiments, the first configuration may be associated with a first imaging device and the second configuration may be associated with a second, different imaging device. For example, a user may previously configure the first configuration for execution by a first imaging device, which may be a device that is only capable of fixed scanning. The user may communicatively connect a second imaging device to the user computing device 102, where the second imaging device may be capable of machine vision scanning. When configuring a machine vision job for the second imaging device, selecting the barcode scanning tool 524 may add to a job flow for the machine vision job the barcode scanning tool 524 configured in accordance with the second configuration. If the machine vision job is deployed, then the second configuration may be transmitted within a job script to the second imaging device for execution.

In other embodiments, the first and second configurations may be associated with the same imaging device (e.g., the imaging device 104), which may be a device capable of both fixed scanning and machine vision scanning. For example, the user may previously configure the first configuration for execution by the imaging device operating in a fixed scanning mode, and then at a later time, transition the smart imaging application 116 to a machine vision job construction mode. When configuring a machine vision job for the imaging device, selecting the barcode scanning tool 524 may add to a job flow for the machine vision job the barcode scanning tool configured in accordance with the second configuration. The second configuration may then be transmitted within a job script to the imaging device for execution.

Figure 6:
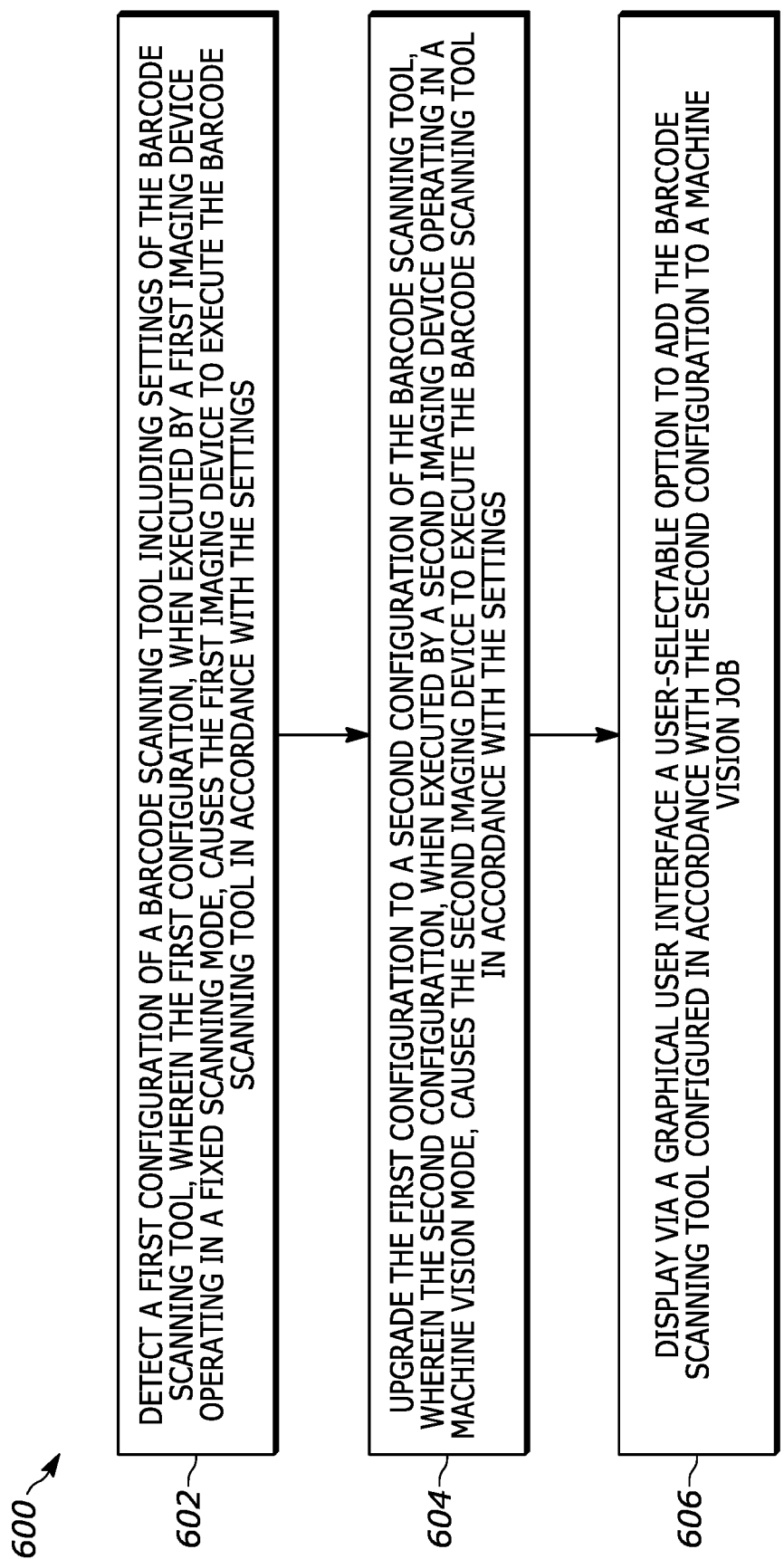
FIG. 6 is a flow diagram of an example method for creating a machine vision job that includes barcode scanning, in accordance with embodiments described herein.

FIG. 6 is a flow diagram of an example method 600 for facilitating creation of a machine vision job including barcode scanning. The method 600 may be implemented by one or more processors (e.g., the one or more processors 108 of the user computing device 102).

At block 602, the one or more processors may detect a first configuration of a barcode scanning tool including settings of the barcode scanning tool, wherein the first configuration, when executed by a first imaging device (e.g., the imaging device 104), operating in a fixed scanning mode, causes the first imaging device to execute the barcode scanning tool in accordance with the settings.

For example, the first configuration may be represented on the user computing device 102 as a first tool configuration file. The settings may be device configuration settings or imaging settings executable by the first imaging device to perform the barcode scanning tool. The first configuration may include settings designated by a user when the smart imaging application was operating in a fixed scanning job construction mode (e.g., designated by a user interacting with the fixed scanning job construction application interface 500 to adjust settings of the barcode scanning tool 514). The first tool configuration file may be converted into or included within a job script which the user computing device 102 can transmit to the first imaging device for execution.

Depending on the embodiment, the first and the second imaging devices may be different devices, or may be the same device. For instance, as mentioned above, the first configuration may have been configured for execution by a first imaging device capable of fixed scanning, and the second configuration may be configured for execution by a second imaging device capable of machine vision scanning and fixed scanning. Alternatively, the first configuration may have been configured for execution by an imaging device capable of both fixed scanning and machine vision scanning, and the second configuration may be configured for execution by the same imaging device.

At block 604, the one or more processors upgrade the first configuration to a second configuration of the barcode scanning tool, wherein the second configuration, when executed by a second imaging device operating in a machine vision mode, causes the second imaging device to execute the barcode scanning tool in accordance with the settings.

Upgrading the first configuration to the second configuration may include generating a second configuration that includes (i) an indication that the second configuration is for machine vision jobs and (ii) the settings of the first configuration. For instance, upgrading the first configuration may include updating the first tool configuration file to a second tool configuration file that includes an indication that the second tool configuration file corresponds to a tool for a machine vision job. The second configuration includes the same settings as the first configuration, but the second configuration is executable by an imaging device operating in a machine vision mode.

At block 606, the one or more processors display via a GUI a user-selectable option to add the barcode scanning tool configured in accordance with the first configuration to the machine vision job. The one or more processors may display the GUI via a display screen (e.g., a display screen included in the I/O interface 114), and the GUI may be an interactive GUI of an application (e.g., the machine vision job construction application interface 520 of the smart imaging application 116). The application may be operating in a job construction mode (e.g., a mode of the application that enables the user to construct machine vision jobs). In the example depicted in FIG. 5B, the user-selectable option corresponds to the user-selectable option to select the barcode scanning tool 524.

The one or more processors may display the user-selectable option in response to detecting the indication in the second configuration that the configuration is for machine vision jobs. For instance, after upgrading the first configuration to the second configuration, the one or more processors may display, within a GUI for creating machine vision jobs, such as the machine vision job construction application interface 520, a user-selectable option for adding the barcode scanning tool configured in accordance with the second configuration to a machine vision job. If the one or more processors detect a selection of the user-selectable option, then the one or more processors may display, within the GUI, the barcode scanning tool in a job flow of the machine vision job (e.g., within the job flow builder section 504). The one or more processors may also display the settings of the barcode scanning tool, which may be automatically populated with the settings in the second configuration (which match the settings of the first configuration).

In addition to the user-selectable option to select the barcode scanning tool (e.g., the barcode scanning tool 524), the one or more processors may display via the GUI at least one additional user-selectable option to add a machine vision tool to the machine vision job (e.g., the other tools displayed in available tool list 522). The machine vision tool may be selected from one or more of a binarization tool, a pattern match tool, or an edge detection tool, for example. If the one or more processors detect a selection of the additional user-selectable option, then the one or more processors may display, within the GUI, the machine vision tool. The one or more processors may also display the barcode scanning tool in the job flow if the one or more processors also detect a selection of the user-selectable option corresponding to the barcode scanning tool.

The method may also include displaying, by the one or more processors via the GUI, a user-selectable option to deploy the machine vision job to the second imaging device (e.g., the job deployment toggle 512). In response to detecting a selection of the user-selectable option to deploy the machine vision job, the one or more processors may generate a job script including the second configuration of the barcode scanning tool (e.g., including the second tool configuration file or a version of the second tool configuration file converted to the format of the job script) and configurations of any other machine vision tools added to the machine vision job. The one or more processors can transmit the job script to the second imaging device for execution, and the second imaging device may execute the job script while operating in a machine vision mode.

Additionally, it is to be understood that each of the actions described in the method 600 may be performed in any order, number of times, or any other combination(s) therein suitable to create a machine vision job. For example, some or all of the blocks of the method 600 may be fully performed once, multiple times, or not at all.

The above description refers to a block diagram of the accompanying drawings.

Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for creating one or more machine vision jobs including barcode scanning, the method comprising:
   detecting, by one or more processors, a first configuration of a barcode scanning tool including settings of the barcode scanning tool, wherein the first configuration, when executed by a first imaging device operating in a fixed scanning mode, causes the first imaging device to execute the barcode scanning tool in accordance with the settings;
   upgrading, by the one or more processors, the first configuration to a second configuration of the barcode scanning tool, wherein the second configuration, when executed by a second imaging device operating in a machine vision mode, causes the second imaging device to execute the barcode scanning tool in accordance with the settings; and
   displaying, by the one or more processors via a graphical user interface (GUI), a user-selectable option to add the barcode scanning tool configured in accordance with the second configuration to a machine vision job.

2. The method of claim 1, wherein the first imaging device and the second imaging device are a same imaging device.

3. The method of claim 1, further comprising:
   detecting, by the one or more processors, a selection of the user-selectable option to add the barcode scanning tool to the machine vision job; and
   displaying, by the one or more processors within the GUI, the barcode scanning tool in a job flow of the machine vision job.

4. The method of claim 3, further comprising:
   displaying, by the one or more processors within the GUI, the settings of the barcode scanning tool in response to detecting the selection of the user-selectable option to add the barcode scanning tool to the machine vision job.

5. The method of claim 1, further comprising:
   displaying, by the one or more processors via the GUI, at least one additional user-selectable option to add a machine vision tool to the machine vision job.

6. The method of claim 5, wherein the machine vision tool is selected from one or more of: a binarization tool, a pattern match tool, or an edge detection tool.

7. The method of claim 5, further comprising:
   detecting, by the one or more processors, a selection of the user-selectable option to add the barcode scanning tool to the machine vision job;
   detecting, by the one or more processors, a selection of the at least one additional user-selectable option to add the machine vision tool to the machine vision job; and
   displaying, by the one or more processors within the GUI, the machine vision tool and the barcode scanning tool in a job flow of the machine vision job.

8. The method of claim 7, further comprising:
   displaying, by the one or more processors via the GUI, a user-selectable option to deploy the machine vision job to the second imaging device;
   detecting, by the one or more processors, a selection of the user-selectable option to deploy the machine vision job to the second imaging device; and
   deploying, by the one or more processors, the machine vision job to the second imaging device, wherein deploying the machine vision job to the second imaging device comprises:
      generating, by the one or more processors, a job script including the second configuration of the barcode scanning tool and a configuration of the machine vision tool;
      transmitting, by the one or more processors via a network connection, the job script to the second imaging device for execution by the second imaging device operating in the machine vision mode.

9. The method of claim 1, wherein upgrading the first configuration to the second configuration includes:

generating the second configuration, the second configuration including (i) an indication that the second configuration is for machine vision jobs and (ii) the settings of the first configuration.

10. The method of claim 9, wherein displaying the user-selectable option includes displaying the user-selectable option in response to detecting the indication in the second configuration.

11. A computer system for creating a machine vision job including barcode scanning, the computer system comprising:
 a first imaging device;
 a second imaging device;
 one or more processors; and
 a non-transitory program memory communicatively coupled to the one or more processors and storing executable instructions that, one executed by the one or more processors, cause the one or more processors to:
  detect a first configuration of a barcode scanning tool including settings of the barcode scanning tool, wherein the first configuration, when executed by the first imaging device operating in a fixed scanning mode, causes the first imaging device to execute the barcode scanning tool in accordance with the settings;
  upgrade the first configuration to a second configuration of the barcode scanning tool, wherein the second configuration, when executed by the second imaging device operating in a machine vision mode, causes the second imaging device to execute the barcode scanning tool in accordance with the settings; and
  display, via a graphical user interface (GUI), a user-selectable option to add the barcode scanning tool configured in accordance with the second configuration to the machine vision job.

12. The computer system of claim 11, wherein the first imaging device and the second imaging device are a same imaging device.

13. The computer system of claim 11, wherein the instructions further cause the one or more processors to:
 detect a selection of the user-selectable option to add the barcode scanning tool to the machine vision job; and
 display, within the GUI, the barcode scanning tool in a job flow of the machine vision job.

14. The computer system of claim 11, further wherein the instructions further cause the one or more processors to:
 display, via the GUI, at least one additional user-selectable option to add a machine vision tool to the machine vision job.

15. The computer system of claim 14, wherein the machine vision tool is selected from one or more of: a binarization tool, a pattern match tool, or an edge detection tool.

16. The computer system of claim 14, wherein the instructions further cause the one or more processors to:
 detect a selection of the user-selectable option to add the barcode scanning tool to the machine vision job;
 detect a selection of the at least one additional user-selectable option to add the machine vision tool to the machine vision job; and
 display, within the GUI, the machine vision tool and the barcode scanning tool in a job flow of the machine vision job.

17. The computer system of claim 16, wherein the instructions further cause the one or more processors to:
 display, via the GUI, a user-selectable option to deploy the machine vision job to the second imaging device;
 detect a selection of the user-selectable option to deploy the machine vision job to the second imaging device; and
 deploy the machine vision job to the second imaging device, wherein deploying the machine vision job to the second imaging device comprises:
  generating a job script including the second configuration of the barcode scanning tool and a configuration of the machine vision tool;
  transmitting, via a network connection, the job script to the second imaging device for execution by the second imaging device operating in the machine vision mode.

18. The computer system of claim 11, wherein the instructions cause the one or more processors to upgrade the first configuration to the second configuration by:
 generating the second configuration, the second configuration including (i) an indication that the second configuration is for machine vision jobs and (ii) the settings of the first configuration.

19. The computer system of claim 18, wherein the instructions cause the one or more processors to display the user-selectable option in response to detecting indication in the second configuration.

20. A tangible, non-transitory computer-readable medium storing executable instructions for creating a machine vision job including barcode scanning that, when executed by at least one processor of a computer system, cause the computer system to:
 detect a first configuration of a barcode scanning tool including settings of the barcode scanning tool, wherein the first configuration, when executed by a first imaging device operating in a fixed scanning mode, causes the first imaging device to execute the barcode scanning tool in accordance with the settings;
 upgrade the first configuration to a second configuration of the barcode scanning tool, wherein the second configuration, when executed by a second imaging device operating in a machine vision mode, causes the second imaging device to execute the barcode scanning tool in accordance with the settings; and
 display, via a graphical user interface (GUI), a user-selectable option to add the barcode scanning tool configured in accordance with the second configuration to the machine vision job.

* * * * *